United States Patent [19]
Wood et al.

[11] Patent Number: 5,757,523
[45] Date of Patent: May 26, 1998

[54] OPTICAL RADIATION DEVICES

[75] Inventors: David Charles Wood; Peter Paul Smyth, both of Woodbridge, United Kingdom

[73] Assignee: British Telecommunications public limited company, London, England

[21] Appl. No.: 379,450

[22] PCT Filed: Jul. 28, 1993

[86] PCT No.: PCT/GB93/01591

§ 371 Date: Mar. 2, 1995

§ 102(e) Date: Mar. 2, 1995

[87] PCT Pub. No.: WO94/02873

PCT Pub. Date: Feb. 3, 1994

[30]  Foreign Application Priority Data

Jul. 28, 1992 [EP] European Pat. Off. .............. 92306894

[51] Int. Cl.$^6$ .............. G02B 5/32; G02B 5/18; G03H 1/02
[52] U.S. Cl. .............. 359/15; 359/3; 359/569
[58] Field of Search .............. 359/11, 12, 15, 359/29, 566, 9, 569

[56]  References Cited

U.S. PATENT DOCUMENTS

| | | | |
|---|---|---|---|
| 3,882,207 | 5/1975 | Hannan et al. | 359/3 |
| 4,214,807 | 7/1980 | Gefeller et al. | 359/7 |
| 4,504,122 | 3/1985 | Bartholomew . | |
| 4,626,069 | 12/1986 | Dammann et al. | 359/569 |
| 4,960,314 | 10/1990 | Smith et al. | 359/15 |
| 5,056,880 | 10/1991 | Barbanell | 359/29 |
| 5,289,299 | 2/1994 | Paek et al. | 359/29 |
| 5,412,506 | 5/1995 | Feldblum et al. | 359/569 |

FOREIGN PATENT DOCUMENTS

| | | |
|---|---|---|
| A0116896 | 8/1984 | European Pat. Off. . |
| WO A 8500667 | 2/1985 | WIPO . |

OTHER PUBLICATIONS

Smyth et al, "Optical Wireless: New Enabling Transmitter Technologies", IEEE International Conference on Communications '93, May 23–26, 1993, Geneva, Switzerland, vol. 1, 26 May 1993, pp. 562–566.

Sweatt, "Transformimg a Circular Laser Beam Into a Square or Trapezoid–Almost", Optical Engineering, vol. 31, No. 2, Feb. 1992, Bellingham US, pp. 245–250 XC257531.

Dames et al, "Efficient Optical Elements to Generate Intensity Weighted Spot Arrays: Design and Fabrication", Applied Optics, vol. 30, No. 19, 1 Jul. 1991, New York US, pp. 2685–2691.

Primary Examiner—Paul M. Dzierzynski
Assistant Examiner—Andrew Chang
Attorney, Agent, or Firm—Nixon & Vanderhye P.C.

[57]  ABSTRACT

A device, particularly an antenna device, for emitting a beam of optical radiation to irradiate a remote target area includes an optical source having a limited wavelength band, and a hologram pattern positioned in the path of a light beam originating from the source, the pattern being selected to produce a composite beam having a predetermined shape or far field pattern conforming to the target area and/or a predetermined distribution of light intensity in the target area. Where the optical source is a point source, the hologram pattern selectively retards the phase of respective components of the incident wavefront to produce a composite beam having a far field pattern that precludes focusing of the beam into a single small spot. The device has particular application in a telecommunication system wherein a data signal is transmitted through free space by an optical beam, at least one characteristic of the beam being controlled by the hologram pattern in the path of the beam.

19 Claims, 7 Drawing Sheets

OPTICAL RADIATION DEVICES

This application is a 371 of PCT/GB93/01591 filed on Jul. 28, 1993.

BACKGROUND OF THE INVENTION

1. Field of the Invention

This invention relates to a device, particularly an antenna device, for emitting a beam of optical radiation to irradiate a remote target area. The invention also concerns an optical free space communication system where an antenna device is transmitting a signal over distances ranging from around half a meter up to several kilometers and where the remote target area is at least 0.5 m$^2$.

2. Related Art

It is well known that a laser can be used to produce a sharply defined and intense beam of infra-red radiation, and that a conventional lens can spread this beam out over a target area. Other point sources, such as infra-red light emitting diodes, can also produce sharply defined directional beams and are used, for example, to illuminate target areas in remote television and video control apparatus.

In general, however, when irradiating a remote target area with optical radiation, much of the radiation from the original source inevitably falls outside the target area and is wasted. Moreover, although the angle of divergence of a beam can be controlled, there is little or no control over the intensity distribution within the beam or he shape of the beam envelope. It is particularly difficult to illuminate a square, rectangular or other non-circular target area with a uniform intensity beam. In an optical free space communication system where the radiation is carrying a telecommunication signal, the spillage of energy can also result in inadvertent detection of the signal by a detector outside the target area.

With intensely bright optical sources, such as lasers, there is also a risk that the infra-red radiation could be inadvertently focused by a lens, for example a binocular lens, on to the skin, or worse still, the retina, and cause permanent damage. This latter problem is particularly acute at high power levels i.e. levels exceeding a few milliwatts and restricts the possible use of high power sources, including both light emitting diode (LED) and laser emitters, in an optical free space communication system, or in any application where optical radiation is emitted into a populated area.

A paper entitled "Transforming a circular laser beam into a square or trapezoid-almost" (Optical Engineering Vol. 31, No. 2, February 1992 pp. 245–250) discusses how a computer-generated hologram positioned in the path of a laser beam can be arranged to transform the shape of the beam from, say, a round beam into a square beam with rounded corners. The transformation is based on the phenomenon that an aberrated laser beam will change shape as it propagates.

A further pacer entitled "Efficient optical elements to generate intensity weighted spot arrays: design and fabrication" (Applied Optics Vol. 30, No. 19, pp. 2685–2691), discusses the design and fabrication of holographic beam splitters for producing multiple beams from a single coherent beam. The computer-generated patterns are made into surface relief diffraction elements or phase gratings by electron-beam lithography followed by plasma etching into quartz glass. Such elements are therefore expensive to produce and are for use in laboratory and in optical parallel computing systems where the multiple beams provide the optical power supply to arrays of modulators or logic devices.

SUMMARY OF THE INVENTION

According to the present invention such elements are designed so that when the beam splitter hologram pattern is positioned in the path of a beam originating from a coherent optical source emitting radiation predominately in a wavelength band having an upper limit less than twice the lower limit, the pattern scatters the incident wavefront into a multiplicity of beams at different angles and out of phase with one another such that the beams cannot be refocused by a lens to reproduce an image of the source.

In addition, when the element is used in an optical free space communication system, the optical radiation is modulated with a telecommunication signal and the hologram pattern is designed to produce a composite beam having a particular shape conforming to a remote target area at least 0.5 meters from the halogram pattern.

Accordingly, the device is safe to use, even at high power levels, and/or it has the ability to direct light accurately into a remote target area of a particular shape while also controlling (if required) the intensity distribution across the area. In an optical free space communication system, the distance of the target area from the optical source can range from 0.5 meters up to several kilometers.

The potential applications of the device are therefore considerable.

Moreover, we have found that an original surface relief hologram pattern etched for example, in quartz glass, can be satisfactorily replicated in a low-cost substrate using established mass-production embossing techniques. It therefore becomes possible to build up large surface area hologram patterns by stepping out the master pattern over the low-cost substrate, or by combining a plurality of the replica patterns obtained from one master. This means that the techniques and devices so far confined to the laboratory and specialised computer applications where the computer-generated holograms generally have surface areas of around 2 cm$^2$ can now be used on a much larger scale, with holograms typically having surface areas of around 100 cm$^2$, in a wide range of consumer products and telecommunication systems.

One such application would be in an optical free space communication system since the device allows safe transmission of greatly increased amounts of power while retaining the advantages of a laser or LED source. In this case, the device could act as an antenna either inside a room or outside at least one building and the target area might then be a particular sector of a room or at least a portion of the building or buildings. For example, it might be a single floor in an office building, an individual window or windows in a building or block of buildings, or a single building or row or block of buildings in a street. Advantageously, the antenna could be positioned at the top of a pole, or a series of poles, in a street as in the present telegraph pole system.

Other possible applications would be in television/video remote controllers where the light should at least point in the general direction of the detector on the TV or video recorder, car brake lights where the light should point in a generally backwards direction and in museums or art galleries where a signal carrying information relating to a particular picture or museum item could be directed by an infra-red beam into an area immediately in front of the picture or item for detection by the wearer of a personal headset.

If the hologram pattern is being used primarily to inhibit focusing of the light, the far field width of the light, or the spread of the beam may not necessarily be any greater than without the hologram. In this case, the only effect of the hologram is to make the light impossible to focus, without necessarily changing the shape or direction of the beam. The hologram is effectively acting as a diffuser. The size of the individual cells in a repeating pattern of cells forming the pattern might then be larger than when the hologram is being used to direct the beam into a particular defined target area.

To accommodate the wavefront of a diverging beam, the hologram pattern is conveniently repeated to form a periodic repeat pattern of a single cell, each cell producing an array of beams. The repeating pattern breaks up the distribution of intensity in the target area into a pattern of individual spots, but these spots can merge into one another if the incident beam is diverging. In this case the dimensions of each cell control the angular spread of the array of beams, and the smaller the cell the greater is the angular spread. The angular spread is equal to the wavelength of the light divided by the size of the cell or opening through which the light passes.

By a limited wavelength band we mean a band having upper and lower limits, particularly, where the wavelength of the upper limit is less than twice that of the lower limit. In addition, the term "optical" is intended to refer not only to that part of the electromagnetic spectrum which is generally known as the visible region but also the infra-red and ultraviolet regions at each end of the visible region.

BRIEF DESCRIPTION OF THE DRAWINGS

By way of example only, some embodiments of the invention are illustrated in the accompanying drawings in which.

DETAILED DESCRIPTION OF EXEMPLARY EMBODIMENTS

Figure 1:
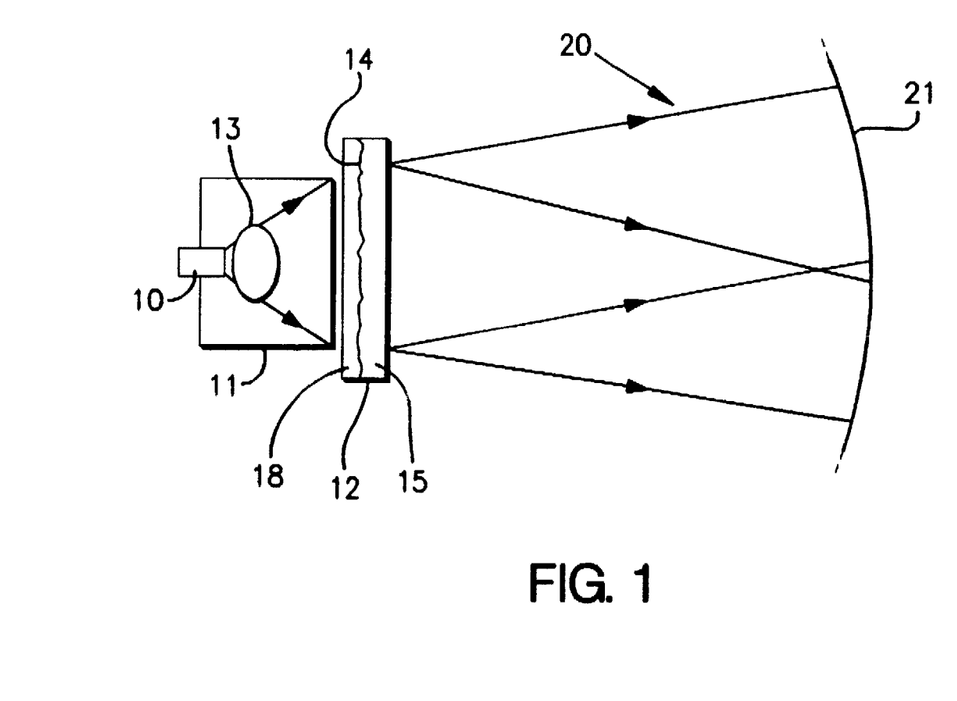
FIGS. 1 and 1a are diagrammatic sketches of an optical radiation device embodying the invention.

Referring first to FIG. 1, the radiation emitter includes a laser diode source 10 enclosed in a housing 11. The front of the housing is open or transparent such that light from the source 10 is incident on a hologram 12 positioned over the front. The housing 11 may optionally include at least one lens 13 to either expand or at least partially collimate the beam before it strikes the hologram.

The hologram 12 consists of a transparent plastics plate 18 on which a replica of a surface relief interference pattern 14 has been embossed from an original master. The pattern itself is protected by a further transparent screen 15.

Figure 5:
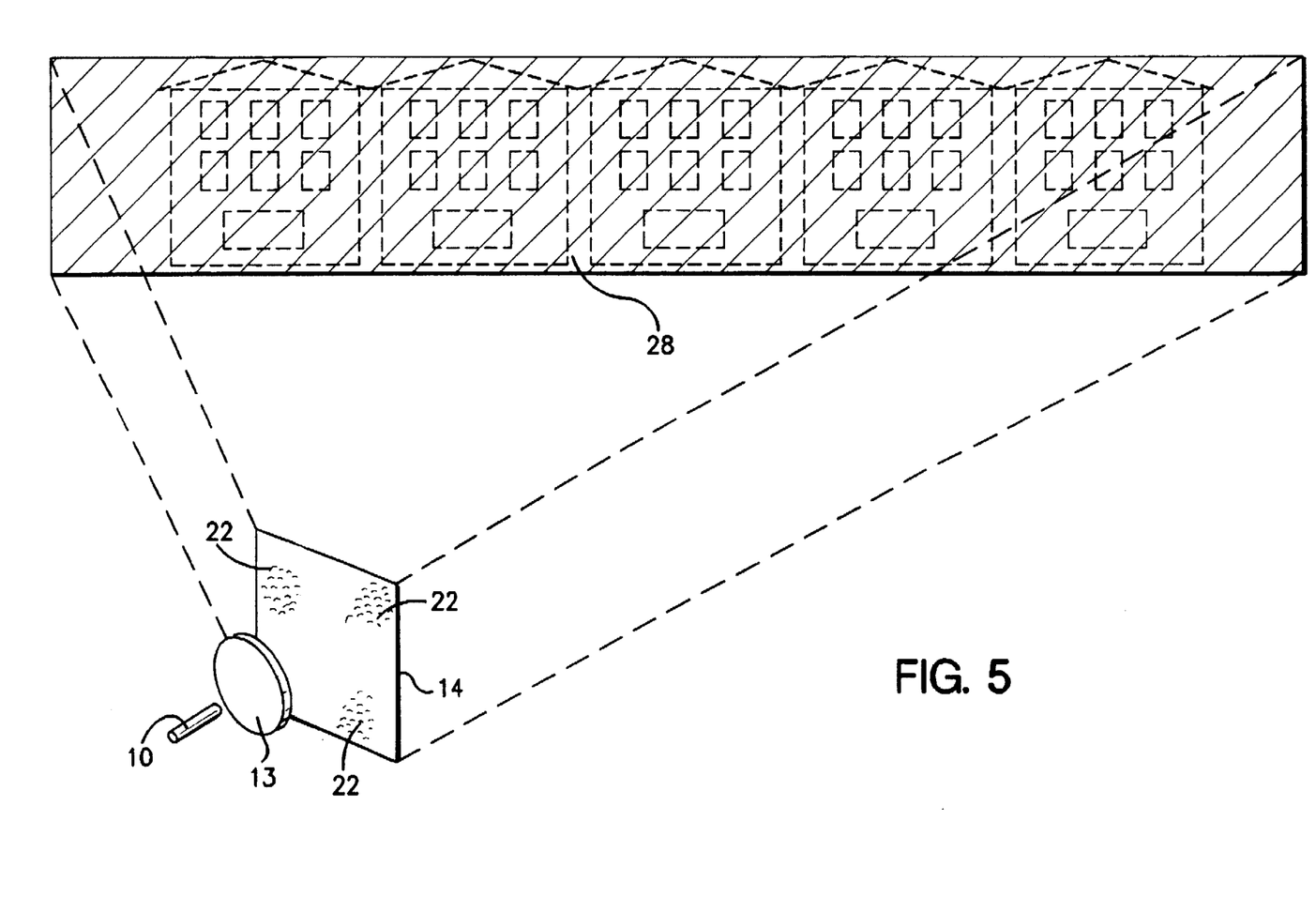
FIG. 5 is similar to FIG. 4 and shows an arrangement for illuminating a row of buildings in a street.

The pattern 14 is a computer-generated interference pattern derived from a mathematical model and conveniently consists of a repeating cell or unit pattern 23 (e.g., see FIG. 5). A detailed report on the production of such patterns can be found in the aforesaid paper entitled "Efficient optical elements to generate intensity weighted spot arrays: design and fabrication" (Applied Optics Vol. 30, No 19 pp 2685–2691).

Each cell pattern 22 is designed to produce an array of beams which together form a composite beam having a predetermined shape and/or distribution in the far field. In one embodiment of the invention the interference pattern 14 in each cell is a binary phase pattern which selectively retards the phase of the incident light. By changing the phase of the incident light, the direction of propagation is changed so that the multiple beams of light emerging from the hologram are propagated in different scattered directions within the angle of the composite beam, making the beam impossible to refocus. For optimum performance, the hologram 12 should be designed to put as much as possible of the incident light into the target area with as little as possible of the light being scattered into higher angles outside this area.

The pattern 22 is derived from an algorithm which initially sets the required far field pattern, compares it with a random pattern of pixels, and assesses the closeness of the fit. Each pixel is then examined in turn to determine whether a change of phase is required to produce a closer fit. The process is repeated many times until a sufficiently close fit is achieved.

Since the pattern 22 is a binary phase pattern, each pixel can have only one of two phases. With an entirely random phase pattern, the far field would be uniformly illuminated and the hologram would act simply as a diffuser. However, by initially setting the algorithm for the far field pattern so that the pattern conforms to a particular shape, such as a square or circle, the hologram pattern is progressively changed from a random pattern to a pattern which produces the required shape. At the same time, the multiple beams of light emerging from the hologram are still scattered at different angles so that the composite beam cannot be refocused to produce a sharp image of the point source 10.

Figure 2A:
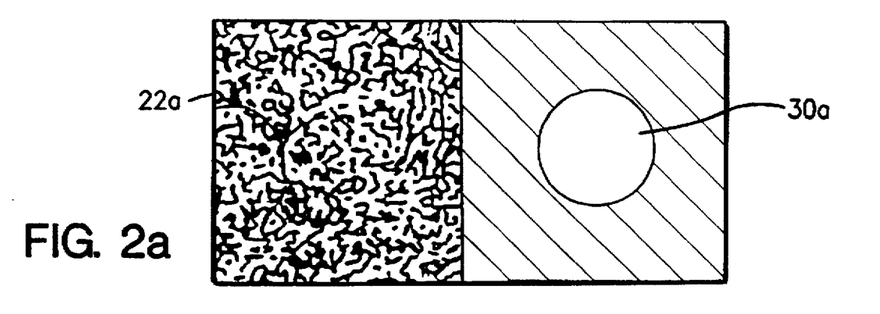
FIGS. 2a–2c illustrate three possible hologram phase patterns for use in the device of FIG. 1 to produce three differently shaped far field patterns.
Figure 2B:
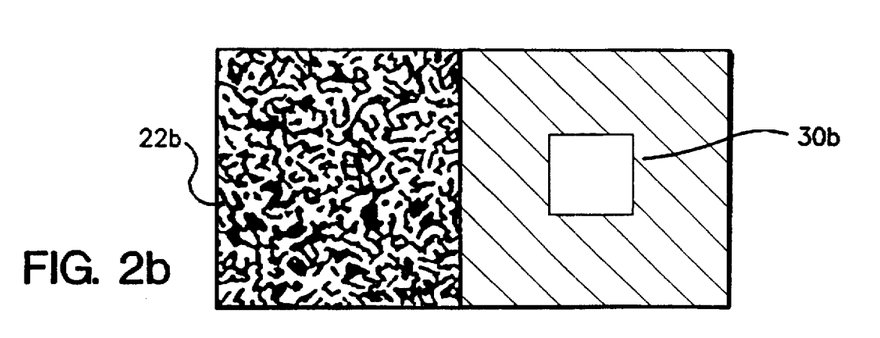
Figure 2C:
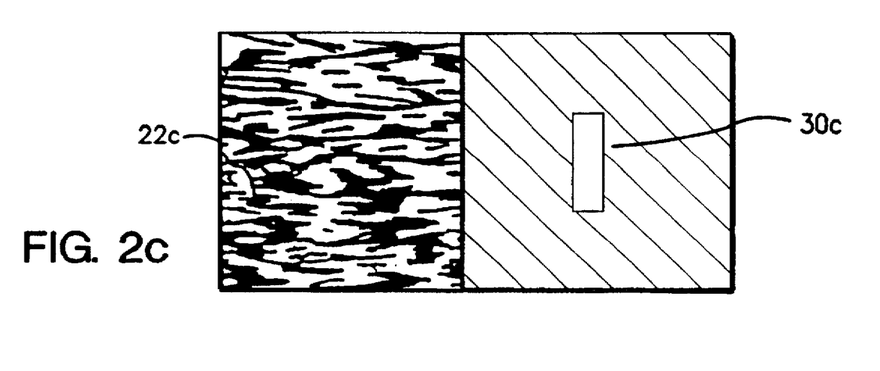

Three possible examples of a single cell in the interference pattern 14 are shown in FIG. 2 together with the resulting light distribution. As can be seen, the cell 22a produces a circular far field intensity pattern 30a, the cell 22b produces a square pattern 30b, and the cell 22c produces a rectangular pattern 30c. The black areas in each cell 22 denote an area with a phase retardance of half a wavelength compared to the white areas. The angular spread of the beams from each cell is equal to the wavelength of the light divided by the size of the cell.

FIGS. 2a–2c illustrate the far field pattern of light which would be obtained if a single cell 22 were illuminated by a coherent parallel light beam of uniform intensity. The far field pattern 30 represents the intensity of the Fourier transform from one single isolated cell of the phase hologram pattern 14, with about 75% of the light energy falling in the bright area and the remaining 25% outside. In practice, by repeating the cell pattern 22 over more than about 20 cells in a two-dimensional array, the Fourier transform becomes an array of spots within the respective bright shaped areas 30a, 30b, 30c shown in FIG. 2 for each of the cell patterns 22a, 22b, 22c.

This large two-dimensional array of cells forms the interference pattern 14 of FIG. 1. The size of each spot in the far field pattern is equal to the size of the spot which would appear in the far field without the hologram so that when illuminated by a diverging beam (rather than a parallel beam) the size of the spots is increased although the spacing between them is unaffected. If the divergence of the beam is sufficiently large (or the spacing between the spots is sufficiently small), the spots may merge into one another to form a continuous intensity distribution.

The interference pattern 22 is preferably a phase-only pattern, i.e. it does not block any light but just changes the phase. The original phase-only pattern is produced, for example, by reactive-ion etching through a black/white pattern mask into quartz glass, or by etching through a photo-resist mask directly printed on the glass by electron-beam lithography. Once the pattern has been recorded on a master plate, any number of replicas can be made either by embossing the pattern directly on to a low-cost plastics substrate or by first preparing a metal negative, for example by plating the quartz glass with silver and nickel and then peeling off the nickel to form a shim, and securing the shim to an embossing roller.

The interference pattern 14 could alternatively be formed as a reflection hologram in which case the etch depth would be selected to retard the phase by a quarter wavelength since the light would then pass through the interference pattern 14 in both directions and the phase would be shifted twice.

The distance of the target area from the optical source 10 can vary from 0.5 meters up to several kilometers.

FIGS. 3-7 illustrate various applications of the device shown in FIG. 1 when used as an antenna device, the same reference numerals being used to denote like parts. Each of these applications is in an optical free space communication system where the light is carrying a telecommunication signal, such as a television signal.

Figure 3:
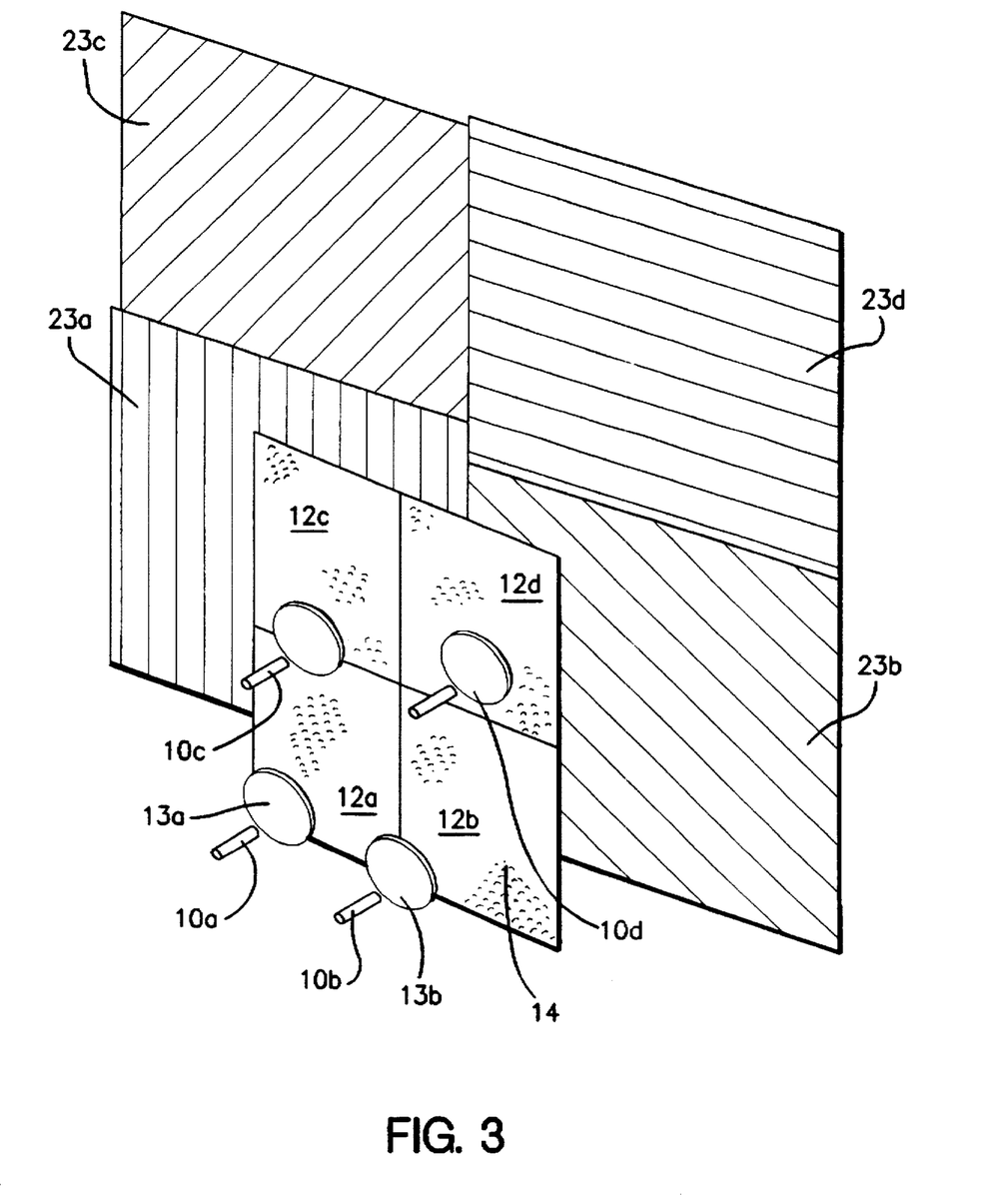
FIG. 3 illustrates diagrammatically an arrangement for illuminating a target area consisting of four juxtaposed square cells using four of the radiation devices in FIG. 1 grouped together.

In FIG. 3 four laser diode sources 10a, 10b, 10c, 10d are used with respective holograms 12a, 12b, 12c 12d to illuminate four juxtaposed target cells 23a, 23b, 23c, 23d.

Figure 4:
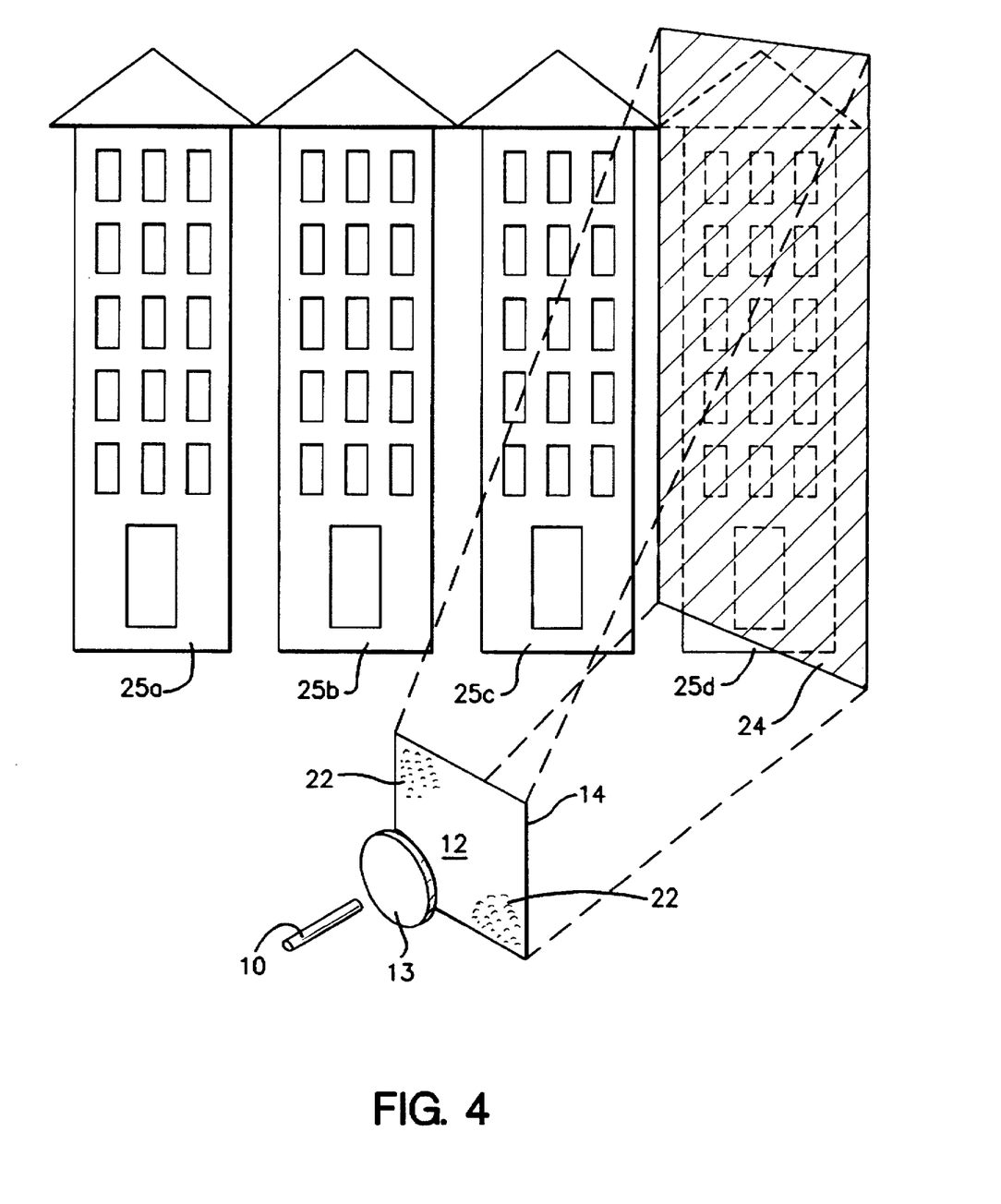
FIG. 4 illustrates diagrammatically an arrangement using the device of FIG. 1 as an antenna device for illuminating a single building in a row of buildings.

In FIG. 4 the hologram 12 has an interference pattern 14 designed to produce a rectangular shaped vertical beam 24 which is used to illuminate a single building 25d in a row of buildings 25a, 25b, 25c an 25d.

In FIG. 5 the hologram pattern 14 again produces a rectangular shaped beam out in this case the beam 28 is horizontal rather than vertical such that it illuminates a row of houses in a street.

Figure 6:
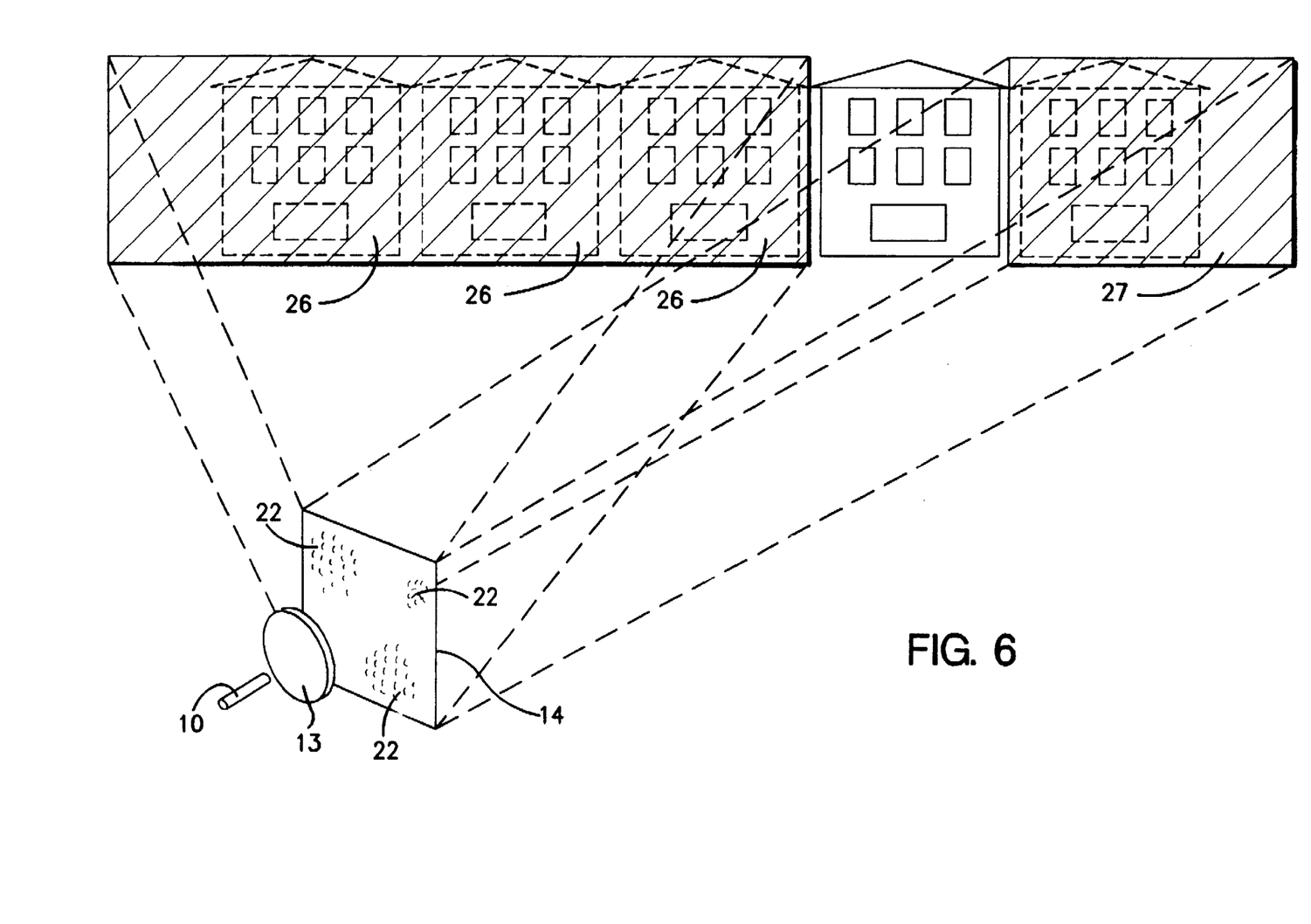
FIG. 6 shows an arrangement for illuminating selected houses in a street.

In FIG. 6 the holographic pattern 14 produces a combination of a rectangular shaped beam and a square shaped beam to pick out individual target areas and hence illuminate both a group of three houses 26 in a street as well as a single individual house 27 in the street. The same principle could be used, for example, to illuminate individual offices in a building.

Figure 7:
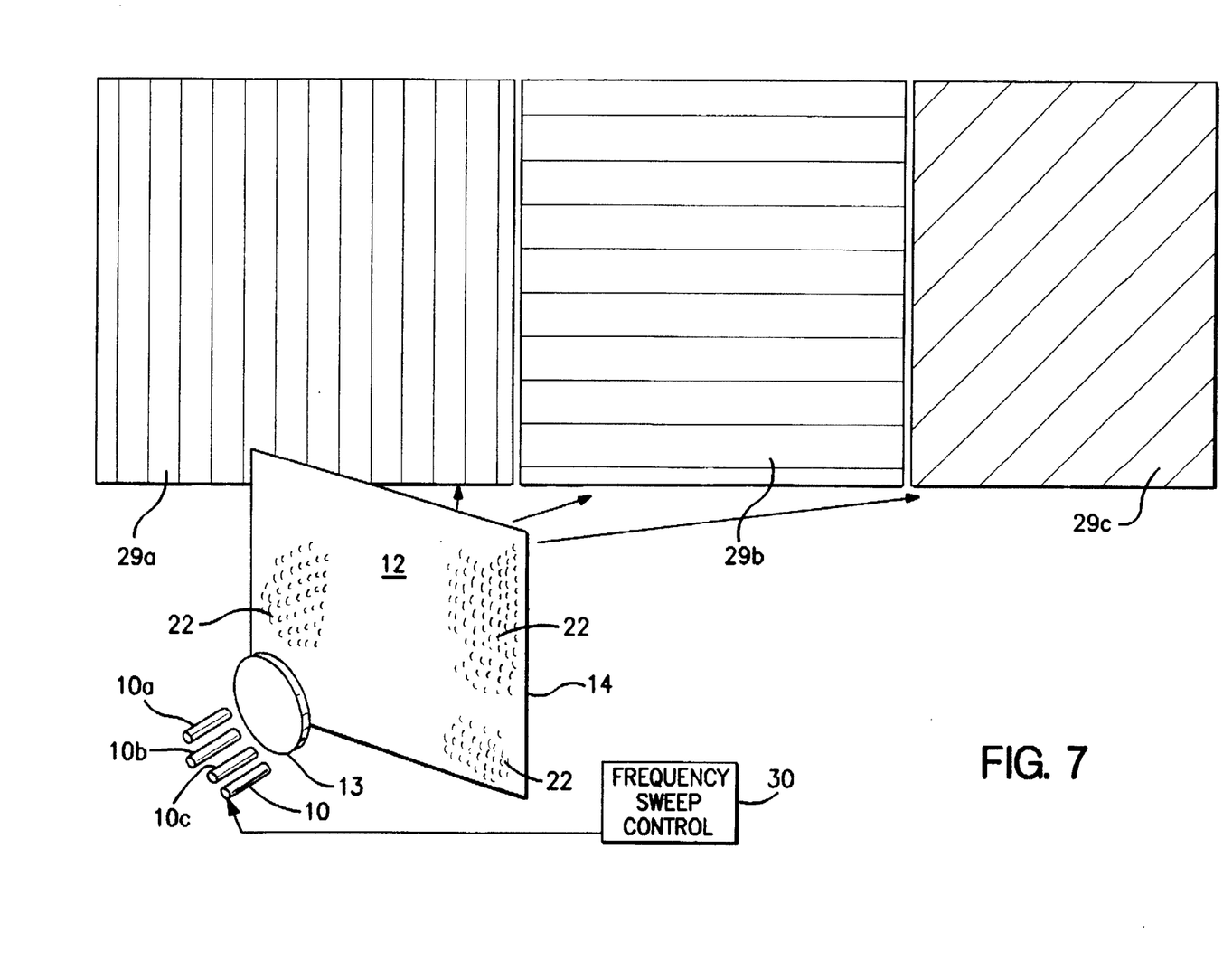
FIG. 7 shows an arrangement having multiple sources at different wavelengths for respectively illuminating three adjacent cells in the target area.

In FIG. 7 multiple laser diode sources 10a, 10b and 10c direct light through a single hologram 12. Each source has a different characteristic wavelength such that the hologram pattern separates the light into adjacent cells 29a, 29b, 29c corresponding to the different wavelength. In this case the hologram 12 could be a simple diffraction grating since the deflection angle of a diffraction grating is proportional to the wavelength. This arrangement is particularly useful where wavelength division multiplexing (WDM) is used for separate data channels. As well as using such a grating as a common element to separate into adjacent cells the output from a number of sources 10 emitting different wavelengths, the grating could be used to gather together on to a single detector the return light at different wavelengths from separate cells, or to separate into different detectors light at several different wavelengths all emitted from the same cell or spatial location.

Another possibility would be to illuminate the hologram 12 using a single source 10 and then sweep the frequency of the source (e.g., with a conventional frequency sweep control 30) such that the beam emerging from the hologram scans the target area.

The use of a hologram to control the shape of the beam in each of the above applications has an important additional advantage. Because the multiple beams emerging from each cell of the interference pattern 14 are scattered at different angles and therefore pointing in different directions, the resulting composite beam from the hologram cannot be refocused into a single point or spot. This means that greatly increased amounts of power can be transmitted without risk of eye or skin damage.

Figure 1A:
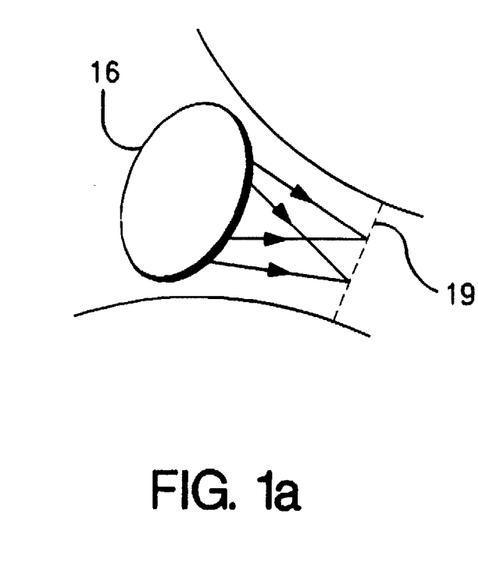

For example, referring to FIG. 1a, if a converging lens 16 (such as an eye lens) is positioned in the path of the composite beam 20 emerging from the hologram 12, a two dimensional array of images of the source 10 would be formed in the back focal plane 19 of the lens. The distribution of intensity in these images is determined by the individual cell pattern 22. The images would be separated by a distance (D$\lambda$)/L where $\lambda$ is the wavelength of the source 10, D the working distance of the focal plane from the lens, and L the width of a single cell or unit in the repeating hologram pattern 14.

Because the source 10 generally emits a narrow range of wavelengths rather than a single wavelength, the images in the back focal plane 19 will be smudged. The greater the range of wavelengths, the greater is the smudging.

To a good approximation, the image in the back focal plane 19 is given by the Fourier Transform of the phase transmittance of the hologram 12 times a phase factor determined by the distance of the lens 16 from the hologram. If the Fourier Transform is such as to produce an extended image in the back focal plane 19, the light will appear to the viewer as if it came from an extended object. The extent of the effective object is given by the extent of the image divided by the magnification of the lens arrangement.

If the hologram 12 produces a uniform N×N square array of beams, the image in the back focal plane 19 (i.e. the target area covered by the array) has a size N (D$\lambda$)/L. If P is the incident power collected by the lens, and the working distance D is 10 mm (which is the distance of the retina from the eye lens at close focus), the power density in the retina is given by P×(L$^2$/$\lambda^2$/N$^2$)×10$^4$W/m$^2$. The power density can therefore be controlled by the hologram pattern—the smaller the unit cell size L, or the greater the number of beams generates, the lower will be the power density. It is possible to achieve a reduction of 2500 times in the maximum cower density in the retina compared with a system transmitting the same total power without a hologram.

The limit to the effectiveness of the hologram 12 in diffusing the light is the effective bandwidth of the source 10. In addition, a small phase error in the hologram gives rise to a small portion of the light being undeflected by the hologram. This portion can be focused by the lens 16. The phase error can be caused by either an error in the depth of the pattern in the surface, a difference in the source wavelength from the design value, or lithographic errors in the processing. Its effect is small, however;—a 10% error in the profile depth or the source wavelength leads to less than 1% of the power being undeflected and would therefore still allow a 100 fold improvement in the amount of power that can be safely emitted.

We claim:

1. An optical device for emitting a beam of optical radiation to irradiate a remote target area, the device including:

a coherent optical source, a hologram pattern positioned in the path of a light beam originating from the source, the source emitting radiation predominately in a wavelength band having an upper limit less than twice the lower limit, and the hologram pattern scattering the incident wavefront into a multiplicity of beams at different angles and out of phase with one another, the multiple beams together forming an incoherent composite beam which illuminates the remote target area and which cannot be refocused by a lens to reproduce an image of the source.

2. A device as in claim 1 in which the hologram pattern is a binary phase pattern.

3. A device as in claim 1 in which the hologram pattern is a surface relief pattern.

4. A device as in claim 3 in which the surface relief pattern is a replica derived from an original master pattern.

5. A device as in claim 4 in which the original master pattern is prepared on a first substrate and the replica is impressed on a second substrate.

6. A device as in claim 5 in which the hologram pattern is formed over the area of the second substrate by repeatedly impressing the master pattern over successive portions of the area.

7. A device as in claim 5 in which the hologram pattern is formed by combining a plurality of replica patterns derived from one original master.

8. A device as in claim 5 in which the second substrate is a transparent plastics substrate.

9. A device as in claim 1 in which the hologram pattern is a repeating pattern of a single cell.

10. An optical free space communication system comprising a device as in claim 1 wherein the radiation incident on the hologram pattern is modulated with a telecommunication signal and the target area is spaced at least 0.5 meters from the optical source.

11. A system as in claim 10 further including a plurality of other optical sources having different wavelength bands, and wherein:

the hologram pattern receives light from each of the sources and separates the incident light into respective composite beams corresponding to the different wavelength bands and each illuminating a respective target area.

12. A system as in claim 10 further comprising;

means for sweeping the frequency of the source through a continuous range of frequencies whereby the composite beam emerging from the hologram pattern scans the target area.

13. A system as in claim 10 in which the optical source is located outside at least one building and the target area comprises at least a portion of the said building or buildings.

14. A system as in claim 10 in which the optical source is located within a room or chamber and the target area is a predetermined sector of the room or chamber.

15. A system as in claim 10 in which the target area is at least $0.5$ $m^2$.

16. A free-space optical signal transmission system having reduced safety hazards for living organisms located in a free-space segment of an optical signal path, said system comprising:

a coherent optical signal source providing a first optical beam;

an optical beam expander disposed to expand the cross-sectional area of said first optical beam; and a plurality of holographic patterns positioned in the path of the expanded area first optical beam to produce a plurality of dispersed output optical beams as a composite output beam of expanded cross-sectional area for transmission through free space in a form which cannot be substantially refocused by a living eye lens to form an image of the coherent optical source.

17. A free-space optical signal transmission system as in claim 16 wherein at least some of said holographic patterns have phase-altering patterns to prevent any possibility of the composite output beam being substantially refocused by a living eye lens to form an image of the coherent optical source.

18. A method for transmitting optical signals through free space while reducing safety hazards for living organisms located in a free-space segment of an optical signal path, said method comprising:

providing a coherent first optical beam;

expanding the cross-sectional area of said first optical beam; and positioning a plurality of holographic patterns in the path of the expanded area first optical beam to produce a plurality of dispersed output optical beams as a composite output beam of expanded cross-sectional area for transmission through free space in a form which cannot be substantially refocused by a living eye lens to form an image of the coherent optical source.

19. A method as in claim 18 wherein at least some of said holographic patterns have phase-altering patterns to prevent any possibility of the composite output beam being substantially refocused by a living eye lens to form an image of the coherent optical source.

* * * * *